US011268497B2

(12) United States Patent
Nielsen

(10) Patent No.: US 11,268,497 B2
(45) Date of Patent: Mar. 8, 2022

(54) ASSEMBLY, AN INSTALLATION PACKAGE AND A METHOD FOR USE IN INSTALLATION OF AN INSTALLATION UNIT IN A WIND TURBINE TOWER

(71) Applicant: Vestas Wind Systems A/S, Aarhus N. (DK)

(72) Inventor: Ben Møller Nielsen, Lystrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 119 days.

(21) Appl. No.: 16/307,690

(22) PCT Filed: Jun. 22, 2017

(86) PCT No.: PCT/DK2017/050205
§ 371 (c)(1),
(2) Date: Dec. 6, 2018

(87) PCT Pub. No.: WO2018/001427
PCT Pub. Date: Jan. 4, 2018

(65) Prior Publication Data
US 2019/0170125 A1    Jun. 6, 2019

(30) Foreign Application Priority Data

Jun. 29, 2016    (DK) .......................... PA 2016 70468

(51) Int. Cl.
*F03D 13/20*    (2016.01)
*F03D 13/25*    (2016.01)
(Continued)

(52) U.S. Cl.
CPC ............. *F03D 80/82* (2016.05); *F03D 13/10* (2016.05); *F03D 13/20* (2016.05); *E04H 12/342* (2013.01);
(Continued)

(58) Field of Classification Search
CPC ..... B66C 1/108; E04H 12/085; E04H 12/342; E04H 12/344; E04H 2012/006;
(Continued)

(56) References Cited

U.S. PATENT DOCUMENTS 3,688,933 A * 9/1972 Rumell ................... B66F 9/186
414/608
4,068,878 A * 1/1978 Wilner .................... B66C 1/663
294/82.17
(Continued)

FOREIGN PATENT DOCUMENTS

CN    101988479 A    3/2011
EP    1788242 A1    5/2007
(Continued)

OTHER PUBLICATIONS

China National Intellectual Property Administration, First Notification of Office Action in CN Application No. 201780040243.X, dated Nov. 1, 2019.
(Continued)

*Primary Examiner* — Brian E Glessner
*Assistant Examiner* — James J Buckle, Jr.
(74) *Attorney, Agent, or Firm* — Wood Herron & Evans LLP

(57) ABSTRACT

An assembly, installation package and method for installing a wind turbine tower. The assembly (139) comprises an installation unit (114) having unit guides (140), each configured to engage a corresponding engagement guide (130) adjacent to an upper inner edge of the tower section (110) to guide the assembly while it is lowered into the tower section. The assembly also includes a yoke (136) releasably connected to the installation unit and comprising yoke guides (146), each configured to engage a corresponding engagement guide (130) adjacent to the upper inner edge of the (Continued)

tower section to guide the assembly while it is lowered into the tower section (110). The assembly (139) is configured such that at least one of the unit guides (140) and/or the yoke guides (146) is or are substantially continuously engaged with the engagement guides (130) from when the assembly (139) enters the tower section (110) until the assembly reaches its installation position within the tower section.

17 Claims, 20 Drawing Sheets

(51) Int. Cl.
*F03D 80/80* (2016.01)
*F03D 13/10* (2016.01)
*E04H 12/34* (2006.01)

(52) U.S. Cl.
CPC ..... *F05B 2230/604* (2013.01); *F05B 2230/61* (2013.01); *F05B 2240/912* (2013.01); *F05B 2240/916* (2013.01); *Y02E 10/728* (2013.01); *Y02P 70/50* (2015.11)

(58) Field of Classification Search
CPC .......... F03D 13/10; F03D 13/20; F03D 80/40; F03D 80/82; F03D 80/88; F05B 2230/60; F05B 2230/61; F05B 2230/604; F05B 2230/608; F05B 2240/912; F05B 2240/916; F05B 2240/917; Y02E 10/728; Y02P 70/523
USPC .......................................................... 52/854
See application file for complete search history.

(56) References Cited

U.S. PATENT DOCUMENTS

| | | | | |
|---|---|---|---|---|
| 4,358,145 A * | 11/1982 | Svensson | ................ | B66C 1/663 |
| | | | | 294/68.3 |
| 4,396,218 A * | 8/1983 | Stevens | .................. | B66C 1/663 |
| | | | | 294/81.41 |
| 5,370,435 A * | 12/1994 | Monk | ..................... | B66F 9/186 |
| | | | | 294/81.21 |
| 7,905,528 B2 * | 3/2011 | Marcel | ................... | B66C 15/00 |
| | | | | 294/81.53 |
| 9,982,658 B2 * | 5/2018 | Tobinaga | ................ | F03D 80/82 |
| 10,107,267 B2 * | 10/2018 | Hansen | .................... | F03D 13/20 |
| 2004/0131467 A1 * | 7/2004 | Wobben | .................. | F03D 80/82 |
| | | | | 416/132 B |
| 2010/0139180 A1 | 6/2010 | Meiners | | |
| 2014/0075860 A1 * | 3/2014 | Edenfeld | ................ | F03D 80/50 |
| | | | | 52/173.1 |
| 2014/0147272 A1 | 5/2014 | Donescu et al. | | |
| 2014/0374679 A1 | 12/2014 | MacKay | | |
| 2015/0260167 A1 | 9/2015 | Stege | | |
| 2015/0345463 A1 * | 12/2015 | Nielsen | .................... | F03D 80/82 |
| | | | | 416/244 A |
| 2016/0215754 A1 * | 7/2016 | Seidel | ...................... | B66C 1/108 |
| 2017/0138351 A1 * | 5/2017 | Tobinaga | ................ | E02D 27/10 |
| 2018/0163703 A1 * | 6/2018 | Jensen | .................. | B66C 13/085 |
| 2019/0077638 A1 * | 3/2019 | Karlsson | .................. | B66C 13/14 |
| 2019/0195201 A1 * | 6/2019 | Thrue | ..................... | F03D 80/82 |
| 2019/0264661 A1 * | 8/2019 | Donescu | ................. | F03D 13/22 |
| 2020/0166022 A1 * | 5/2020 | Soerensen | ............... | F03D 13/10 |

FOREIGN PATENT DOCUMENTS

| | | |
|---|---|---|
| EP | 2128433 A2 | 12/2009 |
| JP | 201132859 A | 2/2011 |
| JP | 2015534527 A | 12/2015 |
| KR | 101455641 B1 | 10/2014 |
| KR | 200478137 Y1 | 9/2015 |
| WO | 2011154110 A1 | 12/2011 |
| WO | 2012130245 A2 | 10/2012 |
| WO | 2014094792 A1 | 6/2014 |
| WO | 2015144178 A1 | 10/2015 |

OTHER PUBLICATIONS

Danish Patent and Trademark Office, Search and Examination Report in PA 2016 70468, dated Jan. 25, 2017.
European Patent Office, International Search Report and Written Opinion in PCT Application No. PCT/DK2017/050205, dated Sep. 18, 2017.
Japanese Patent Office, Notice of Reasons for Refusal in JP Application No. 2018/568723, dated Jun. 1, 2021.

* cited by examiner

ASSEMBLY, AN INSTALLATION PACKAGE AND A METHOD FOR USE IN INSTALLATION OF AN INSTALLATION UNIT IN A WIND TURBINE TOWER

FIELD OF THE INVENTION

The present invention relates to the installation of an installation unit in a section of a wind turbine tower, and particularly though not exclusively to the installation of a power converter module.

BACKGROUND

Wind turbine plants typically include a rotor/turbine mounted on top of a tower. The rotor may include one or more blades that convert wind into rotary motion, which is in turn converted to electrical energy by known means.

Wind turbine towers typically contain electrical equipment such as, for example, converter electronics, voltage switch gear and a transformer. In some cases these components or equipment are provided as part of an installation unit that is mounted in the tower by lowering the unit into a section of the tower after the section has been installed. As is known, such an installation unit is often referred to as a 'power converter module' or PCM.

Typically, as the installation unit is being lowered, technicians positioned within internal tower levels ensure that the unit does not contact and, thus, damage the tower wall. The technicians also correctly align the installation unit with supporting abutments or projections deeper inside the tower. Because wind towers are typically located in windy areas, it is possible for wind gusts to move the installation unit as it is being lowered. This could lead to injury of the technicians installing the unit, while also slowing down the installation.

WO 2014/094792 describes a guide system for installing an installation unit into a wind turbine tower. As the installation unit is lowered into an open end of the tower, engagement elements on the installation unit receive parallel stays extending vertically within the tower. The installation unit is guided by the stays as it is lowered into the tower. Installation and removal of the stays and engagement elements may be time consuming.

SUMMARY OF THE INVENTION

In accordance with the invention, there is provided an assembly for use in installation of a wind turbine tower, the assembly comprising:
  an installation unit for installation within a tower section of the wind turbine tower, the installation unit comprising a plurality of circumferentially spaced-apart unit guides, each of the unit guides being configured to engage a corresponding engagement guide on or adjacent to an upper inner edge of the tower section to guide the assembly while it is lowered into the tower section; and
  a yoke releasably connected to the installation unit and comprising a plurality of circumferentially spaced-apart yoke guides, each of the yoke guides being configured to engage a corresponding engagement guide on or adjacent to the upper inner edge of the tower section to guide the assembly while it is lowered into the tower section;
  the assembly being configured such that, while the assembly is being lowered, at least one of the unit guides and/or the yoke guides is or are substantially continuously engaged with the engagement guides from when the assembly enters the tower section until the assembly reaches its installation position within the tower section.

The assembly may comprise the same number of unit guides as yoke guides, wherein each of the unit guides is vertically aligned with a corresponding one of the yoke guides.

The installation unit may comprise a frame for holding electrical components, and the unit guides may comprise radially outer portions of the frame.

The frame may comprise a plurality of vertically extending frame members, each unit guide comprising a radially outer edge of one of the frame members.

The frame may include a portion that is polygonal in plan, in which case each of the frame members is vertically aligned with a vertex of the polygon.

The frame may include a portion that is rectangular in plan, in which case each of the frame members is vertically aligned with a corner of the rectangle.

The height of the assembly may be such that when the installation unit is installed at its final vertical position within the tower section, the yoke guides are positioned adjacent their respective engagement guides.

The installation unit may comprise at least one camera system, the camera system being configured and orientated to capture images comprising at least one of the engagement guides while the assembly is lowered towards the tower section, thereby to assist in positioning of at least one of the unit guides relative to its or their corresponding unit guide or guides.

The or each camera system may be detachably mounted to the installation unit, to enable uninstalling of the or each camera after the installation unit has been installed.

The assembly may comprise at least one wireless communication interface for sending the captured images for viewing on a remote apparatus.

In accordance with the invention, there is provided an installation package for a wind turbine, the installation package comprising:
  an assembly as described above; and
  a wind turbine tower section comprising a plurality of engagement guides on or adjacent to an upper inner edge of the tower section to guide the assembly while it is lowered into the tower section.

The engagement guides may be detachable from the wind turbine tower section.

In accordance with the invention, there is provided a method of installing an installation unit in a tower section of a wind turbine tower, comprising:
  lifting an assembly above an open end of the tower section, the assembly comprising:
    an installation unit for installation within the tower section, the installation unit comprising a plurality of circumferentially spaced-apart unit guides; and
    a yoke releasably connected to the installation unit and comprising a plurality of circumferentially spaced-apart yoke guides; and
  lowering the assembly into the open end, the open end comprising a plurality of engagement guides, wherein:
    each of the unit guides is configured and positioned to engage at least one of the engagement guides so as to maintain the assembly in a predetermined position relative to the tower section while the assembly enters the open end and is lowered into it; and
    each of the yoke guides is configured and positioned to engage at least one of the engagement guides so as to continue to maintain the assembly in a predetermined position relative to the section as the assembly is lowered further into the open end.

The method may comprise temporarily attaching the engagement guides to the section at or adjacent the open end prior to lowering the assembly into the open end.

The method may comprise disconnecting the yoke from the installation unit once the installation unit reaches its final position, and withdrawing the yoke from the section.

BRIEF DESCRIPTION OF DRAWINGS

Embodiments of the invention will now be described, by way of example only, with reference to the accompanying drawings, in which.

All figures are schematic and not necessarily to scale.

DETAILED DESCRIPTION OF EMBODIMENTS OF THE INVENTION

Figure 1:
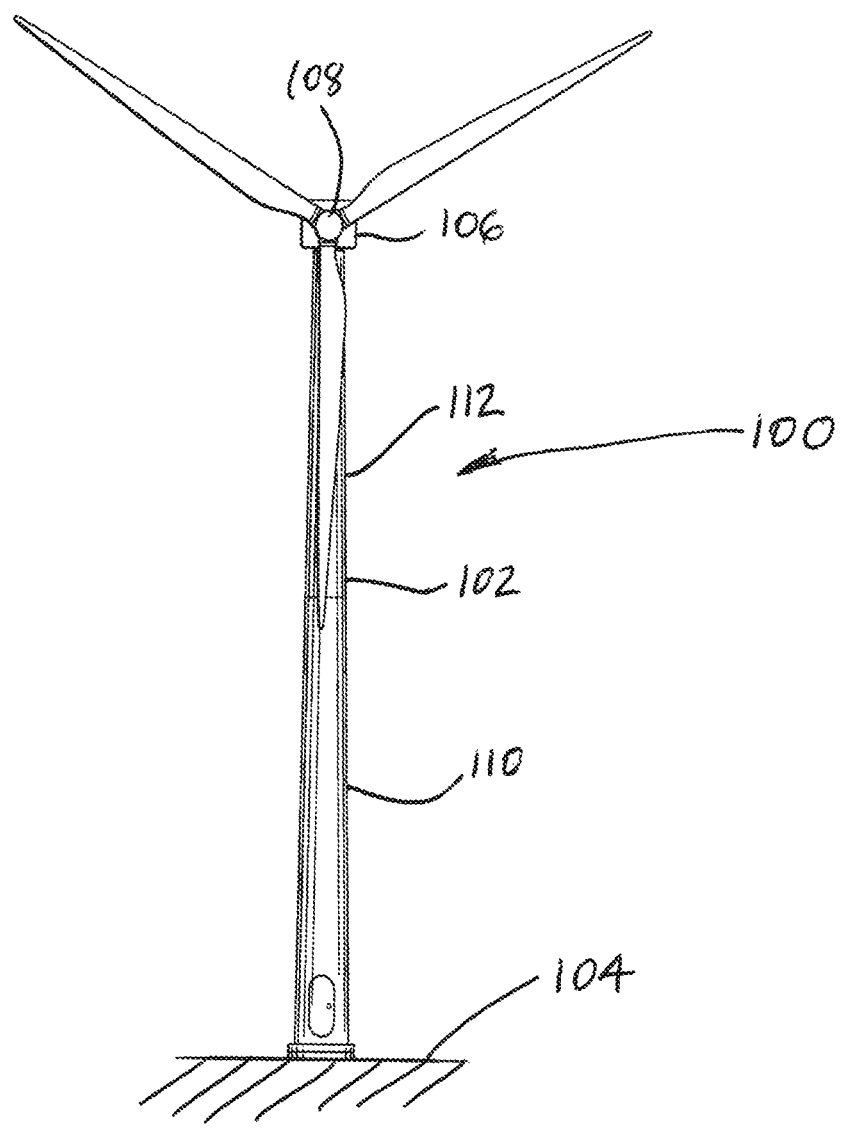
FIG. 1 is a front elevation of a wind turbine.

Referring to FIG. 1, there is shown a wind turbine 100. The wind turbine 100 includes a generally vertical tower 102 mounted to a foundation 104 or a temporary support. The tower 102 supports a nacelle 106. A rotor 108 is mounted to the nacelle 106 for rotation about a horizontal axis, to convert wind into rotational energy. The nacelle 106 houses a turbine (not shown) along with other mechanical and electrical systems to support the conversion of the rotational energy into electrical energy.

Depending upon the height of the wind turbine 100, a wind turbine tower may be constructed from a single section or by stacking and joining several sections. For example, the tower 102 of the wind turbine 100 shown in FIG. 1 comprises a lower section 110 and an upper section 112.

Figure 2:
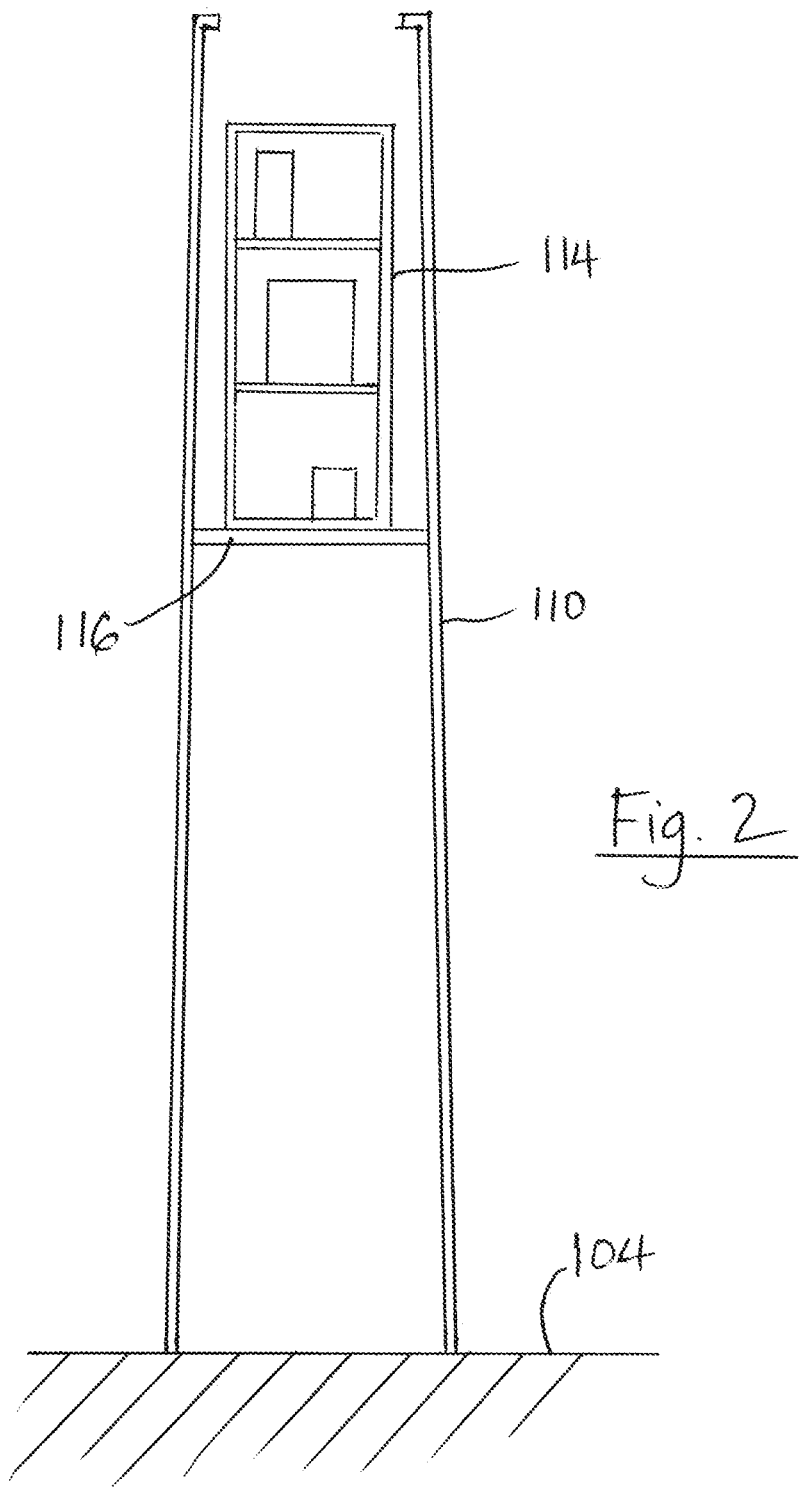
FIG. 2 is a vertical section through a first section of a tower of the wind turbine of FIG. 1 showing an installed position of an installation unit.

As is common in larger scale wind turbines, the tower 102 (and sections 110 and 112) is hollow. In many cases, additional equipment is installed within the tower 102. For example, FIG. 2 shows the lower section 110 during construction of the wind turbine of FIG. 1. The lower section 110 has been positioned on the foundation 104. Once installation of the lower section 110 is complete, an installation unit 114 is lowered into place by, for example, a crane (not shown). Internal supports, such as struts 116, hold the installation unit 114 in place vertically within the lower section 110.

Figure 2A:
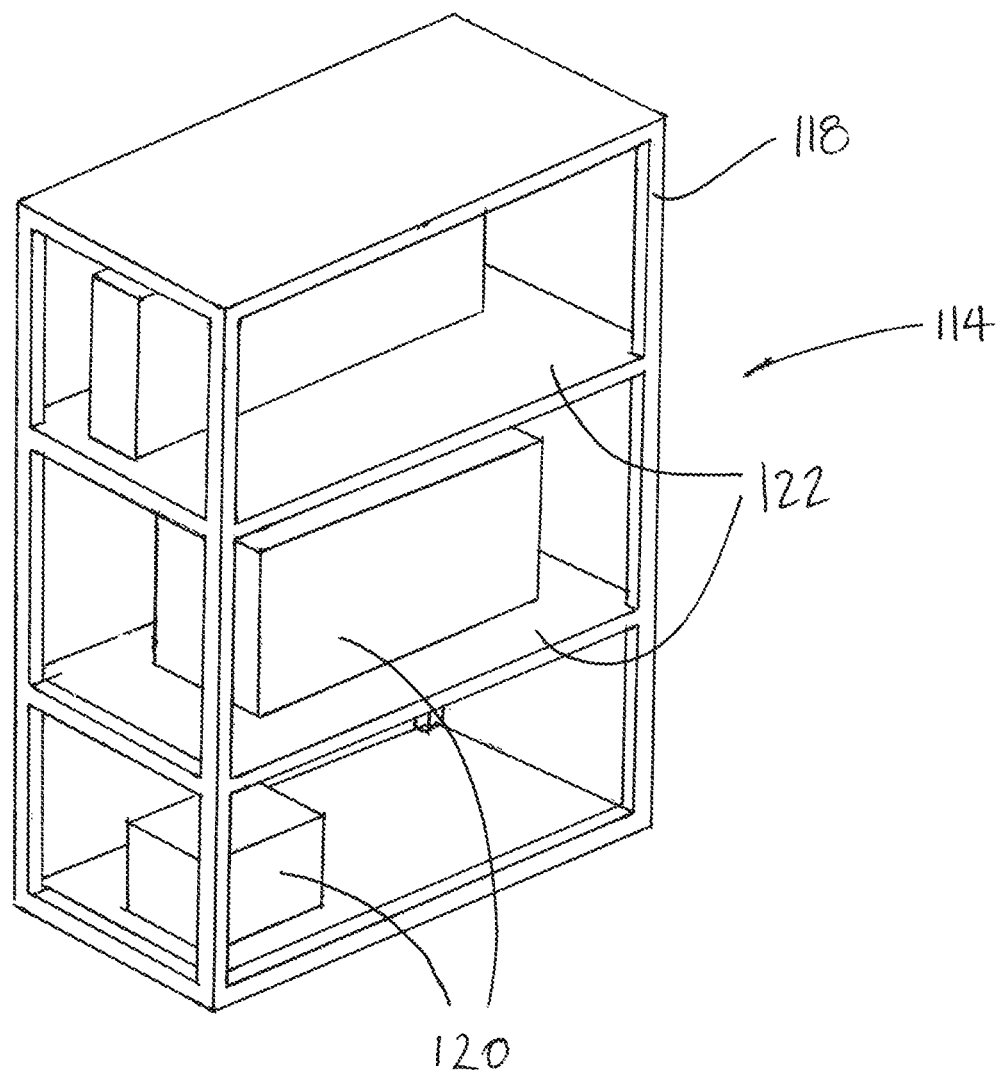
FIG. 2A is a perspective view of the installation unit shown in FIG. 2.

An example of an installation unit 114 is shown in FIG. 2a. The installation unit 114 includes a unit frame 118 for supporting electrical equipment 120 such as converter electronics, voltage switch gear and a transformer. Depending upon the amount of equipment it needs to hold, the installation unit 114 can include one or several floors 122 to which the electrical equipment 120 is attached by way of bolts, brackets, welding, or other suitable means.

Figure 3:
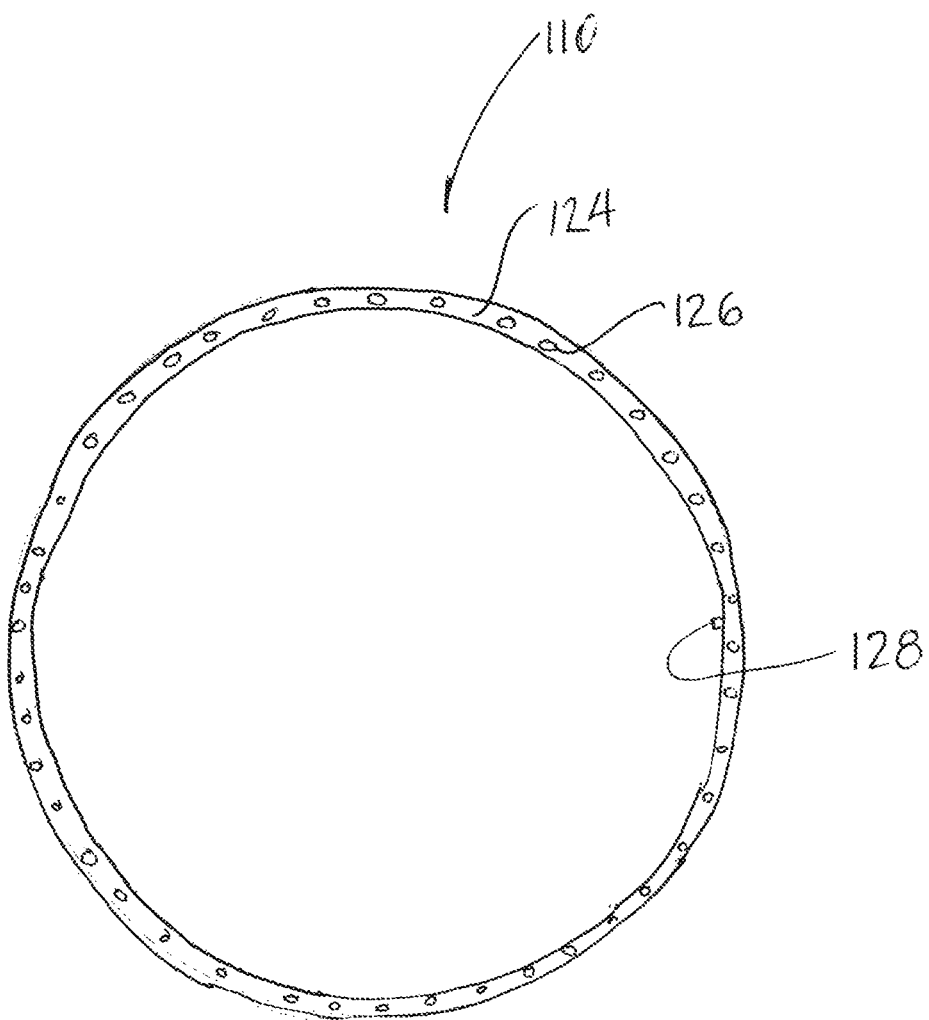
FIG. 3 is a plan view of an upper end of the first section of FIG. 2.
Figure 4:
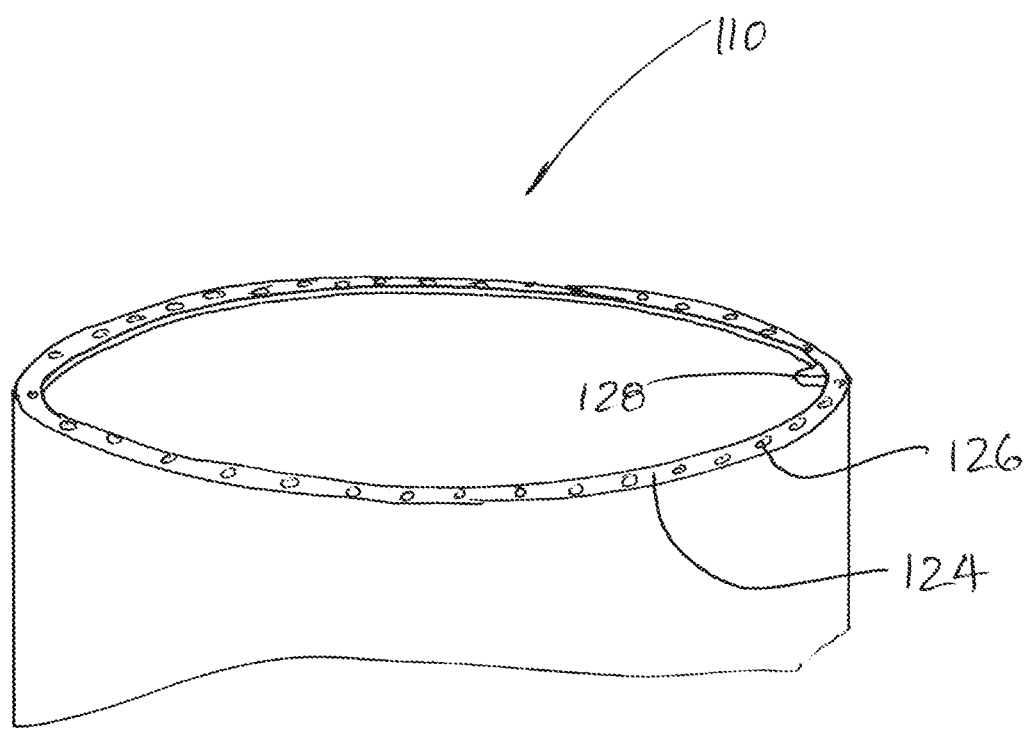
FIG. 4 is a perspective view of the upper end of the first section shown in FIG. 3.

Turning to FIGS. 3 and 4, an upper end of the first section 110 includes an internal flange 124. The flange includes several axially extending through holes 126. The upper section 112 has a corresponding flange (not shown) at its lower end with similarly positioned holes. Once the upper section 112 is placed onto the lower section 110 with the respective holes aligned, bolts (not shown) are inserted through the holes and nuts (not shown) are used to clamp the upper and lower sections together. Conventionally, the holes on each flange are numbered sequentially in a circumferential direction (eg, clockwise). A reference indicator 128 allows the technicians installing the tower to identify the starting position of the hole numbering relative to the tower section.

Figure 5:
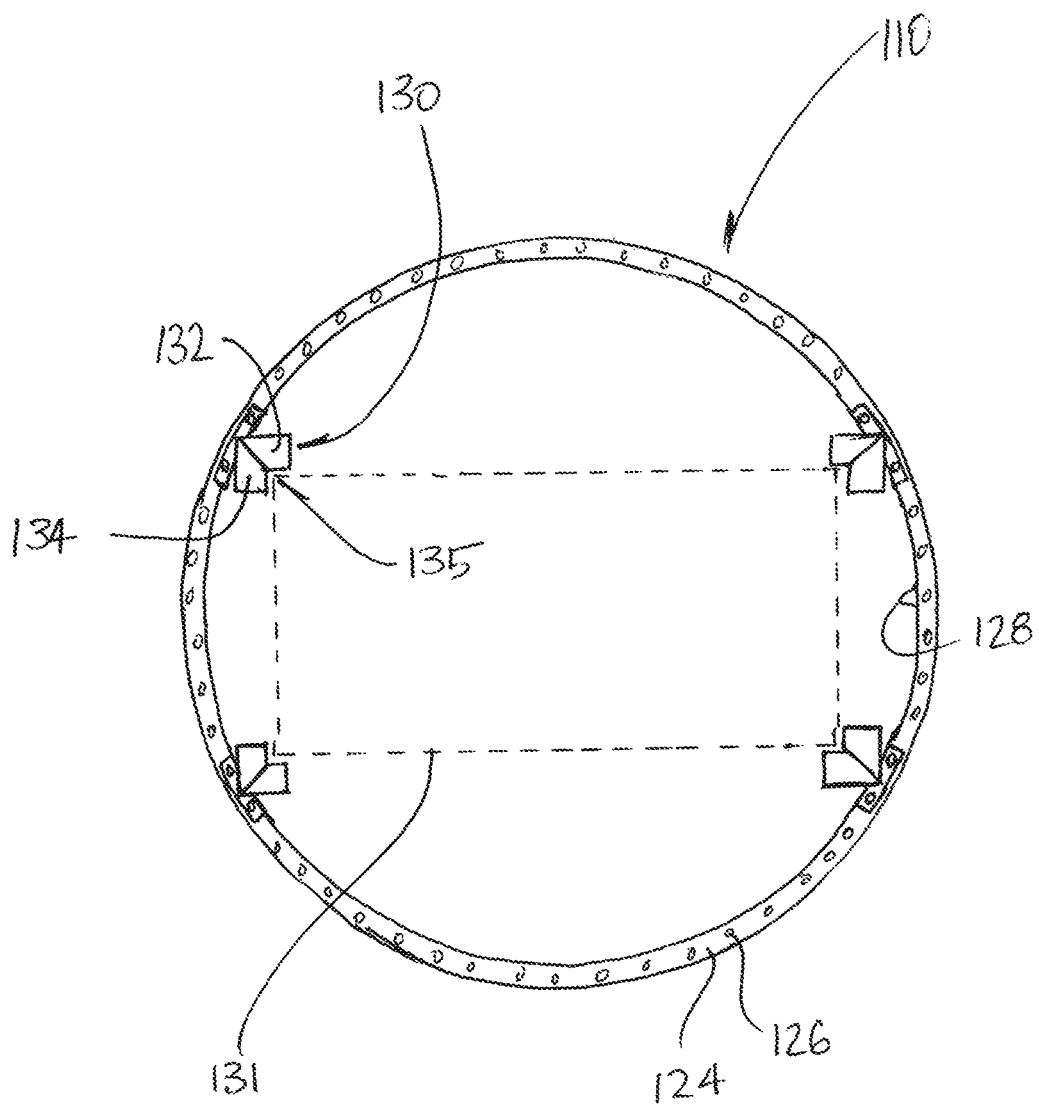
FIG. 5 is a plan view of the upper end of the first section shown in FIGS. 3 and 4, with engagement guides installed.
Figure 6:
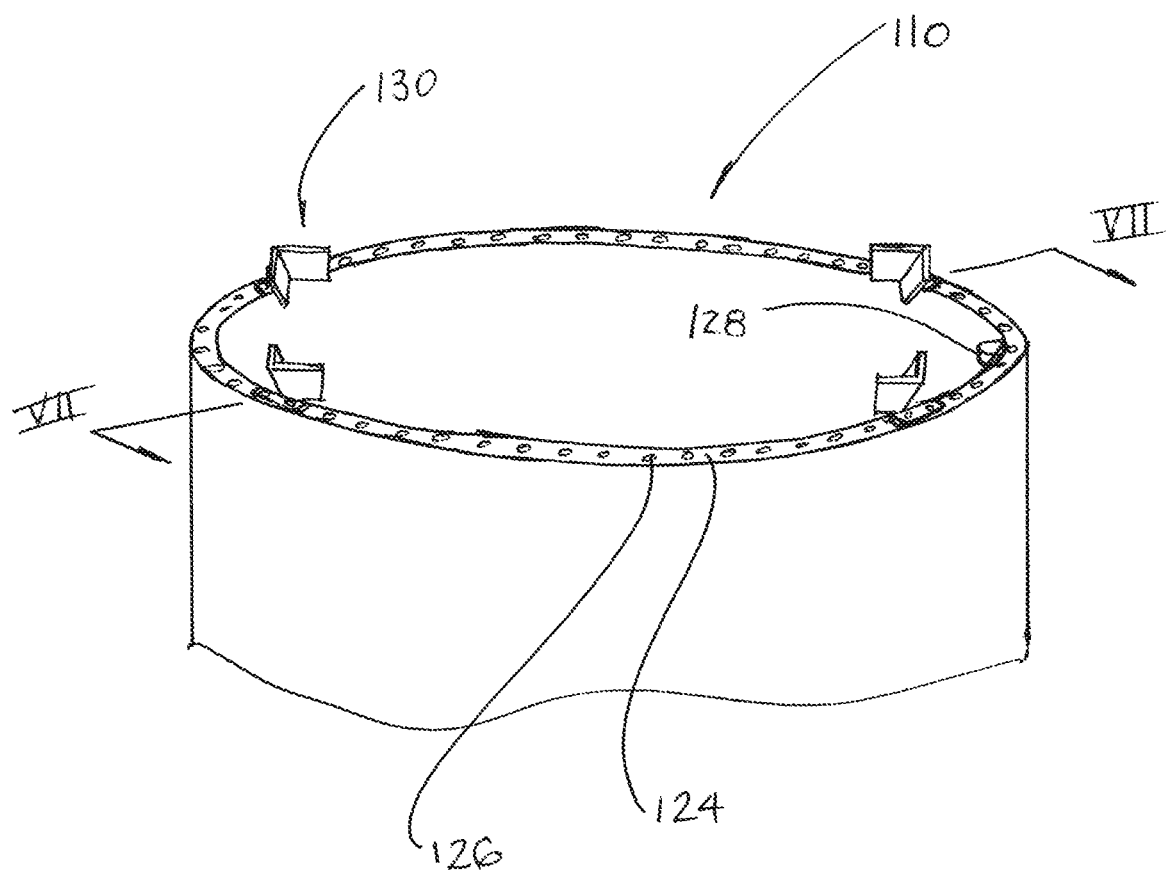
FIG. 6 is a perspective view of the upper end of the first section with engagement guides installed as shown in FIG. 5.
Figure 6A:
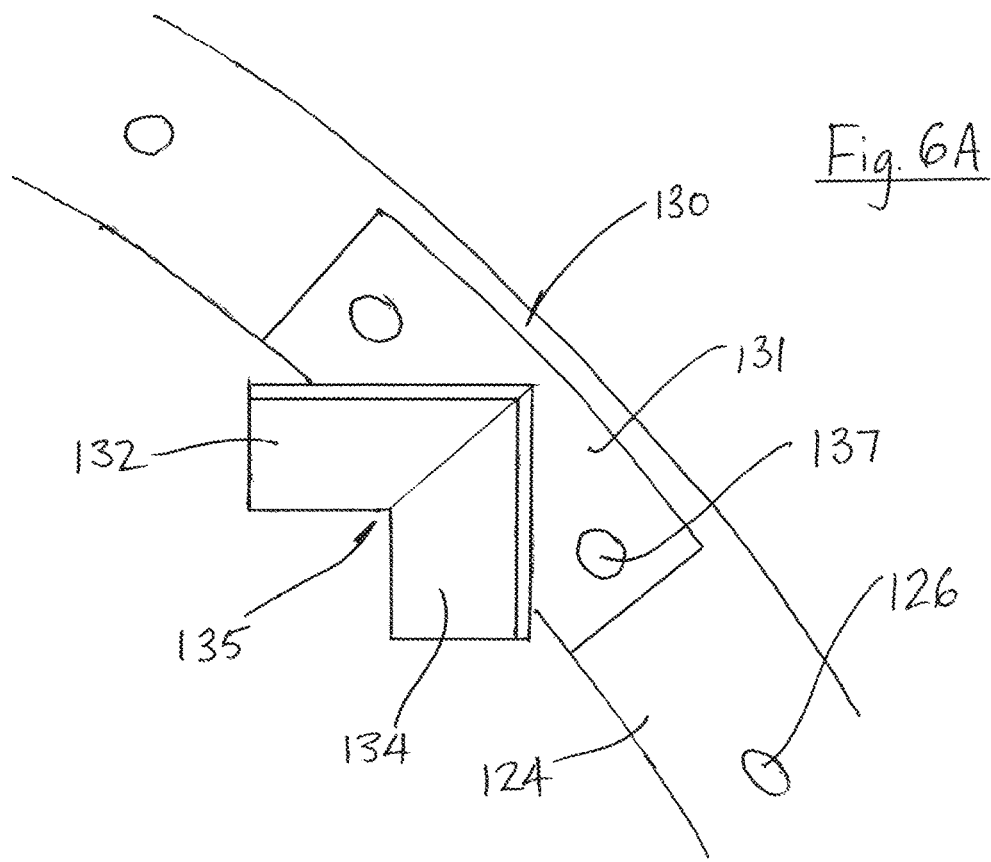
FIG. 6A is a detail plan view showing one of the engagement guides of FIG. 6.
Figure 6B:
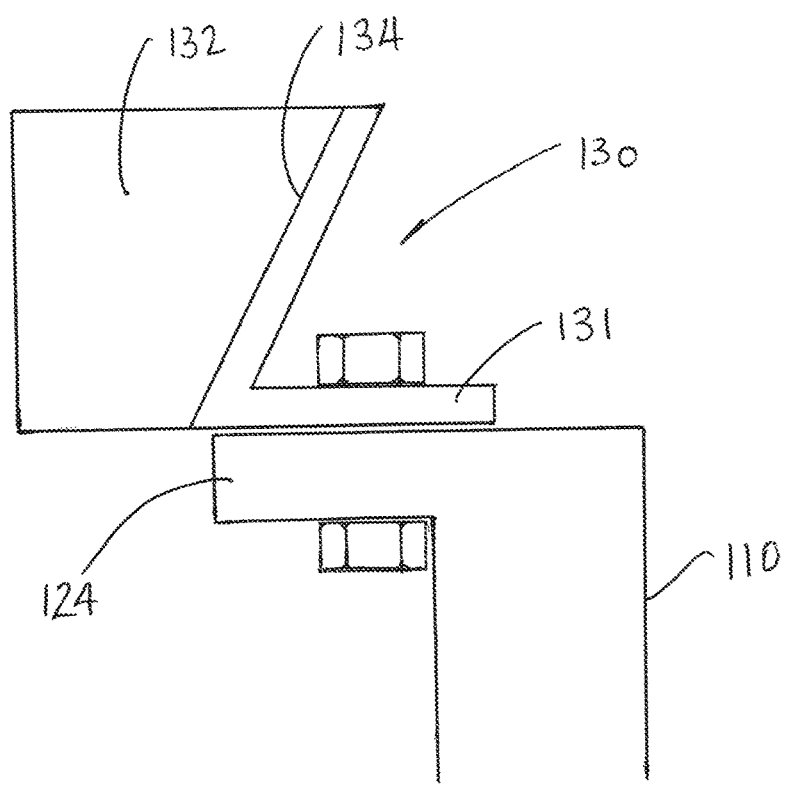
FIG. 6B is a vertical section through the engagement guide of FIG. 6A.
Figure 7:
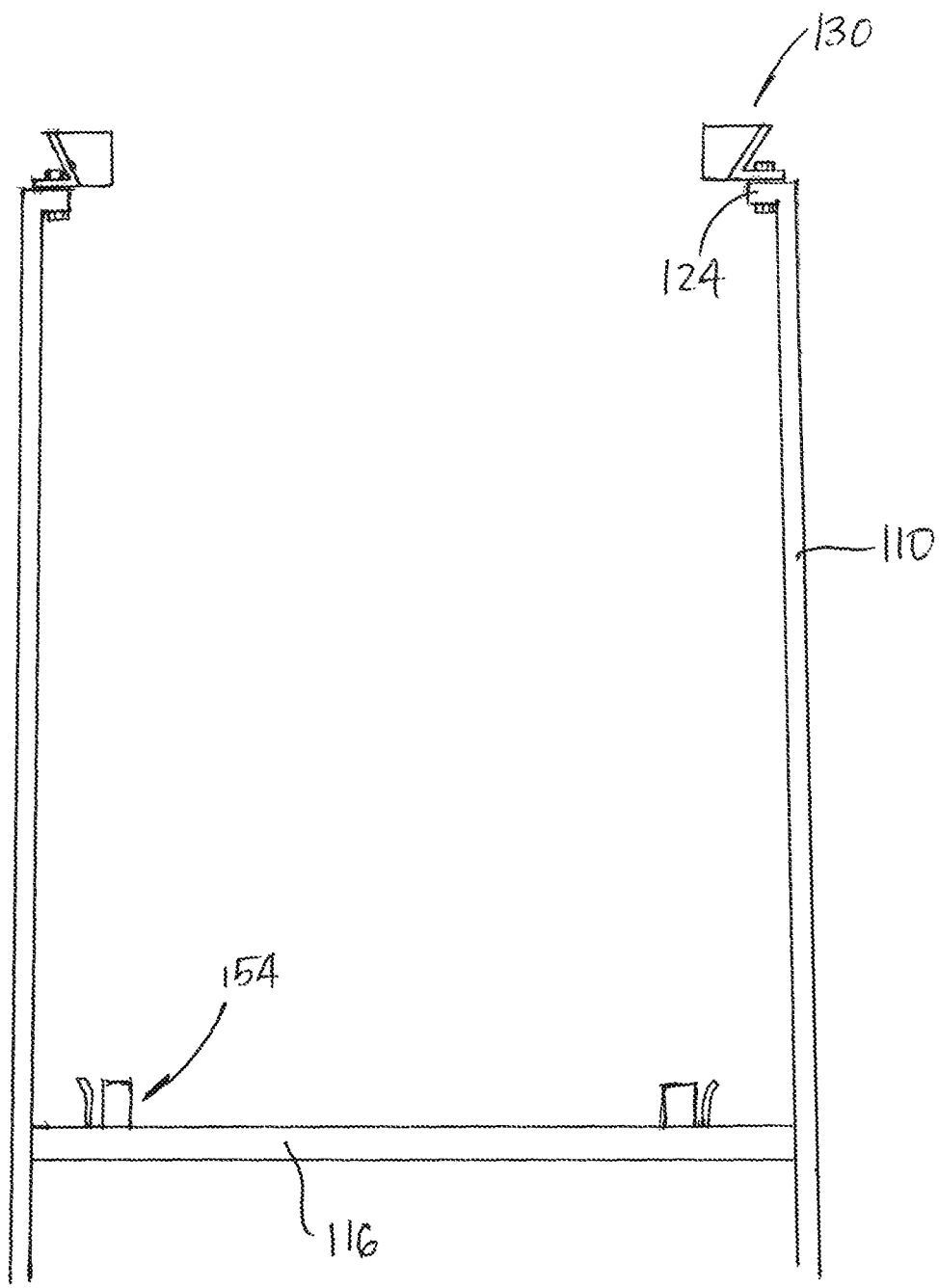
FIG. 7 is a vertical section taken through the first section and a pair of opposed engagement guides shown in FIGS. 5 and 6.

Turning to FIGS. 5 to 7, once the first section 110 has been installed on the foundation 104 or temporary support, engagement guides 130 are installed onto the flange 124. As best shown in FIGS. 6A and 6B, each engagement guide 130 may include inclined surfaces 132 and 134 that together form a converging ramp 135. The interaction of this ramp 135 with the installation unit 114 during its installation will be described in more detail below. Each engagement guide 130 includes a bracket portion 131 having, in the illustrated example, two through holes 137.

As shown in FIGS. 6A, 6B and 7, each engagement guide 130 can be bolted to the flange 124 via overlapping pairs of holes 126 and 137 (for clarity, the bolts are not shown in FIG. 6A). The engagement guides 130 are positioned on the flange 124 with reference to particular holes 126, the positions of which can be determined by counting from the reference indicator 128.

The number of engagement guides 130 can be selected based on the requirements of a particular installation. Where an installation unit 114 with a rectangular (in plan) frame or footprint is used, four engagement guides 130 may be installed, for example. As shown in FIGS. 5 and 6, the engagement guides are positioned such that there is sufficient clearance between them for the installation unit (indicated with dotted line 131) to slide through them.

As shown in FIGS. 6A and 6B, once installed, each engagement guide 130 extends radially inwardly from the flange 124, while also extending above the flange 124.

Figure 8:
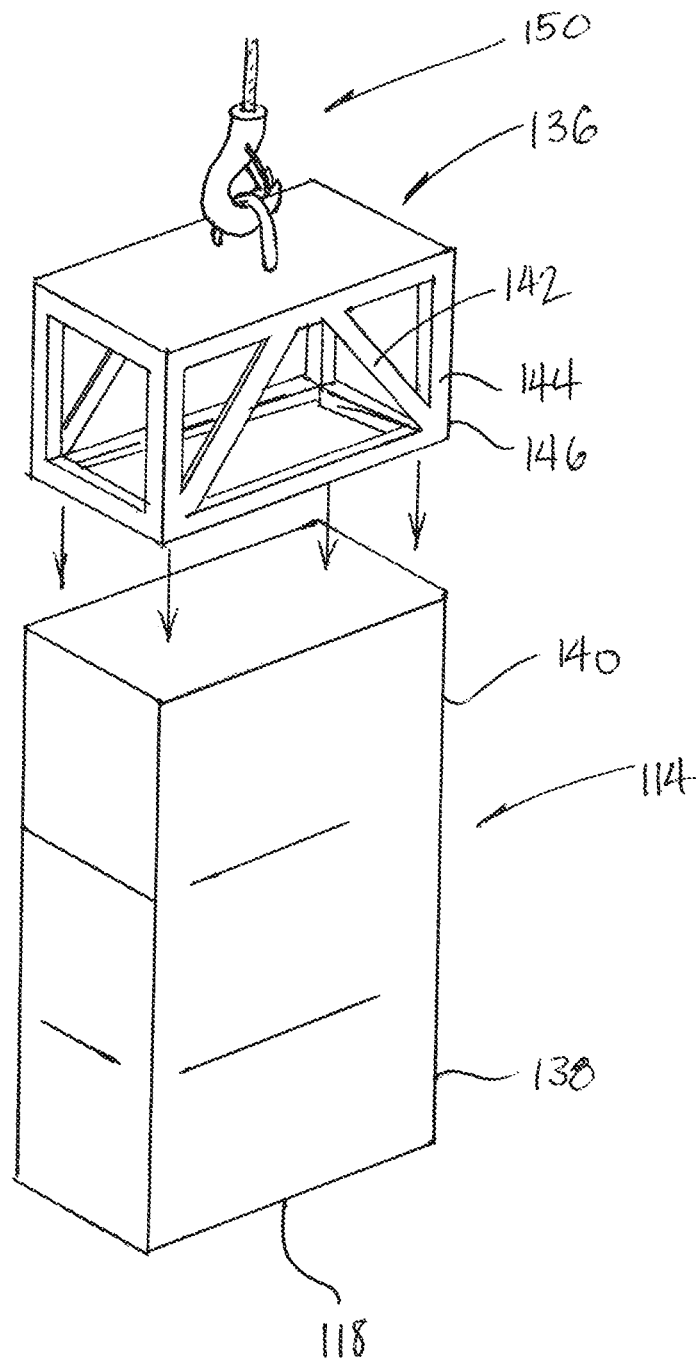
FIG. 8 is a perspective view of a yoke and an installation unit, prior to assembly.

Turning to FIG. 8, there is shown the installation unit 114 and a yoke 136. The yoke 136 is releasably connected to the installation unit 114 by any suitable means, such as clamps, bolts, hooks or other attachment mechanisms (not shown) known to those skilled in the art. The connection can be made at any suitable time, such as before the installation unit 114 and yoke 136 are transported to site, or (more likely) onsite shortly before the installation is to take place. The purpose of the yoke 136 is to provide a coupling for a crane hook or clamp while distributing the lifting force to suitable hard points on the installation unit 114. This ensures that the installation unit 114 can safely be lifted for installation in the tower without risk of breakage or distortion.

Figure 9:
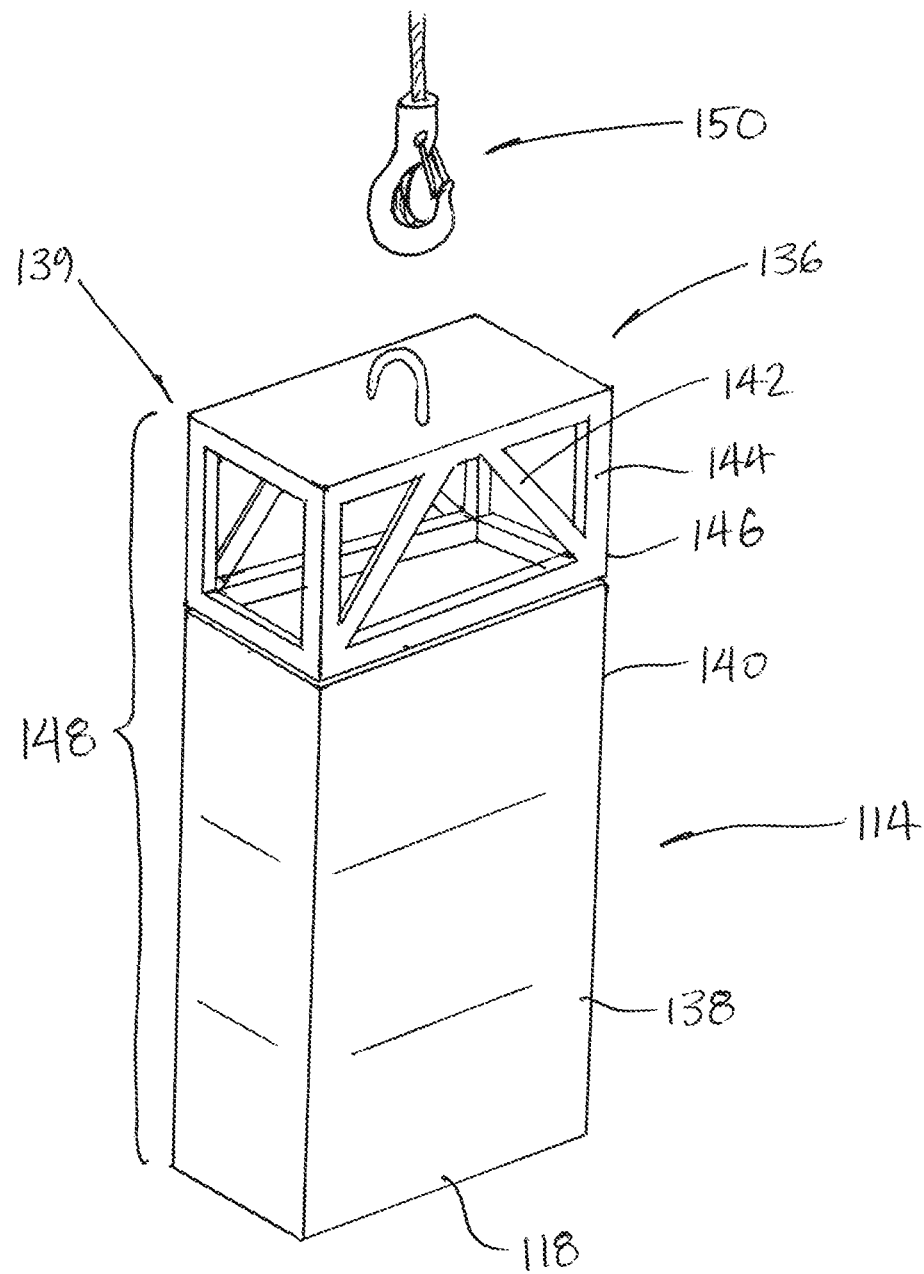
FIG. 9 is an assembly comprising the yoke of FIG. 8 releasably connected to the installation unit of FIG. 8, to form an assembly in accordance with the invention.

FIG. 9 shows the yoke 136 releasably connected to the installation unit 114 to form an assembly 139 for use in installation of a wind turbine tower.

The unit frame 118 of the installation unit 114 comprises four vertical frame members 138 positioned at each corner/vertex (in plan) of the installation unit 114. It will be appreciated that the positional relationship of the frame members 138 provides the installation unit 114 with a rectangular footprint or form factor, in the illustrated embodiment, although other embodiments are envisaged in which a different number of frame members provide a differently shaped footprint, for example triangular or pentagonal. The shape of the footprint may be a polygon or any other suitable shape. Where the footprint is a polygon the frame members may be vertically aligned with one or more vertices of the polygon.

In the embodiment shown in FIGS. 8 and 9, the installation unit 114 is provided with unit guides 140 in the form of radially outer edges of the frame members 138. As described in more detail below, each of the unit guides 140 is configured to engage a corresponding engagement guide 130 during installation of the installation unit 114 in the lower section 110.

The yoke 136 comprises a yoke frame 142 that, like the frame of the installation unit, comprises four vertical frame members 144 positioned at each corner/vertex (in plan) of the yoke 136. In the embodiment shown in FIGS. 8 and 9, the yoke 136 is provided with yoke guides 146 in the form of radially outer edges of the frame members 144. As described in more detail below, each of the yoke guides 144 is configured to engage a corresponding engagement guide 130 during installation of the installation unit 114 in the lower section 110. Also, while the yoke 136 and installation unit 114 are connected, each yoke guide 144 is vertically aligned with a corresponding one of the unit guides 140. Each vertically aligned yoke guide 146 and unit guide 140 pair effectively forms a relatively continuous vertical guide 148. Expressed another way, the yoke frame 142 has a footprint or form factor, defined by its four vertical guides 144, which substantially corresponds or matches the footprint of the installation unit 140. In effect, the yoke frame 142 is a continuance of the installation unit 114.

Installation of the installation unit 114 into the lower section 110 will now be described with reference to FIGS. 9 to 15.

As shown in FIG. 9, the assembly 139, comprising the yoke 136 releasably connected to the installation unit 114, can be attached to a crane hook 150.

Figure 10:
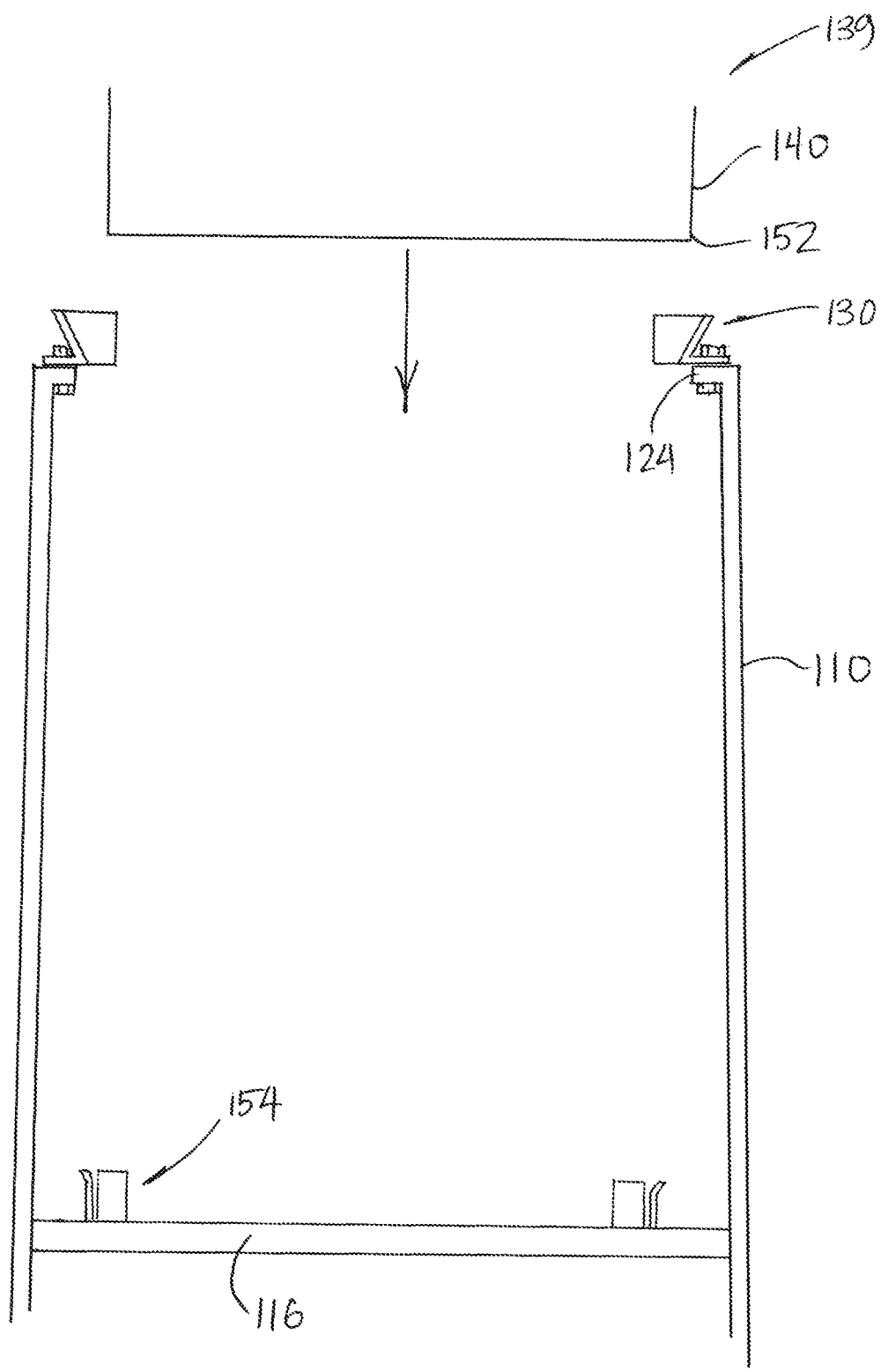
FIGS. 10 to 15 show a sequence for installing the installation unit in the first section, in accordance with the invention.

As shown in FIG. 10, the crane (not shown) to which the crane hook 150 (see FIG. 9) is attached lifts the yoke 136, and thereby the assembly 139, into a position just above the lower section 110. Guide ropes or other stabilising/guiding stays (not shown) can be used to rotate and translate the installation unit 114 until a lower end 152 of each unit guide 140 is vertically aligned with a corresponding one of the engagement guides 130. The position and spacing of the engagement guides 130 is such that there is some tolerance in the alignment of each lower end 152 relative to its corresponding engagement guide 130.

Figure 11:
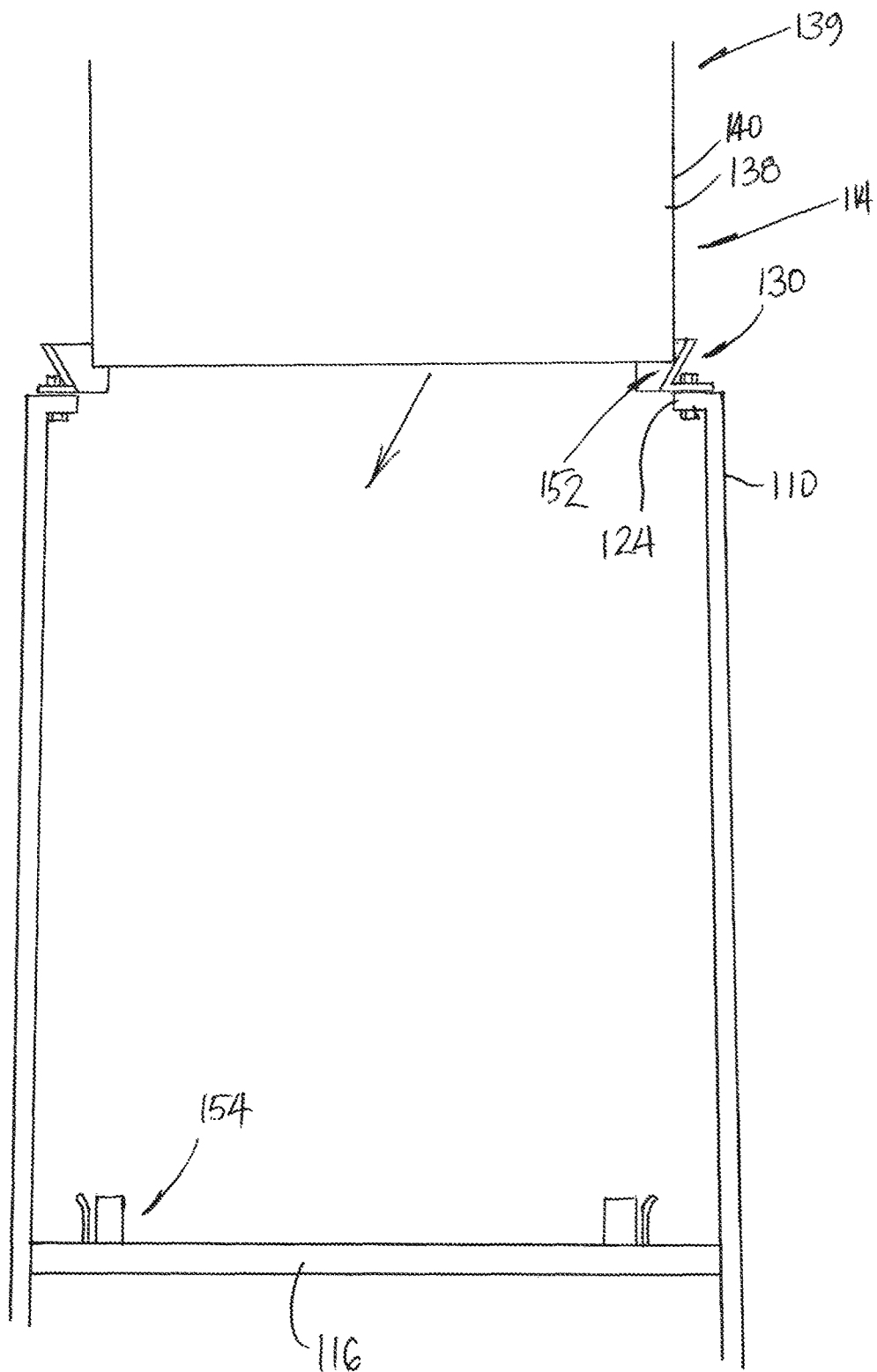

The crane can then carefully lower the assembly 139 towards engagement with the engagement guides 130. As best shown in FIG. 11, if there is misalignment between the lower ends 152 of a unit guide 140 and their corresponding engagement guides 130, at least one of the lower ends 152 will engage one or both of the inclined surfaces 132 and 134. As the assembly 139 continues to be lowered, the interaction of the lower end 152 and inclined surfaces 132 and 134 will if necessary gradually rotate the assembly 139 until it is aligned with the engagement guides 130, as well as centralising the assembly 139 within the engagement guides 130.

Figure 12:
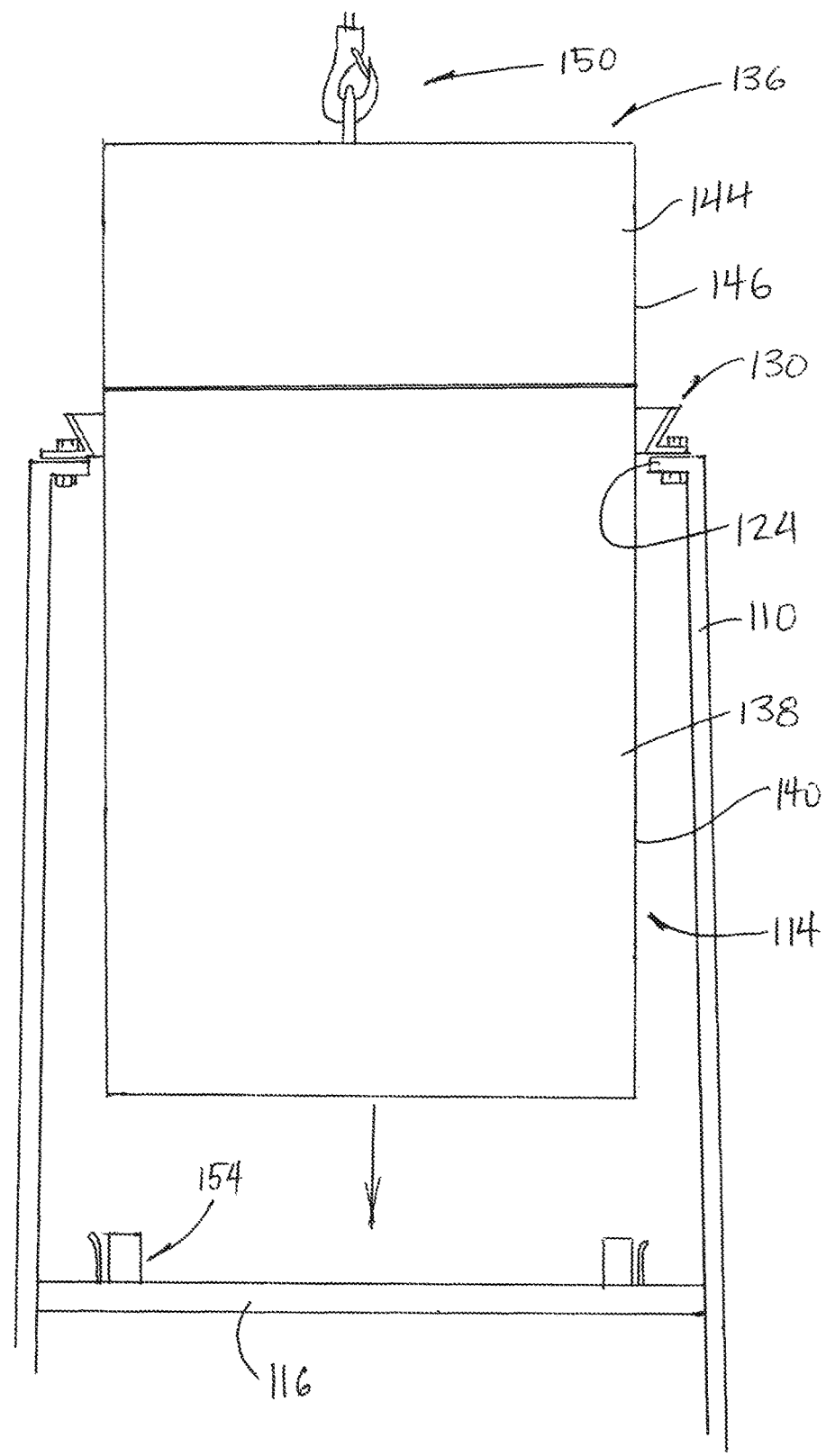

This alignment of the assembly 139 relative to the engagement guides 130 ensures that the assembly 139 is correctly positioned relative to the interior of the lower section 110 as it is further lowered as shown in FIG. 12. In addition, the relatively continuous guide 148 formed by each vertically aligned yoke guide 146 and unit guide 140 pair ensures that the installation unit 114 is maintained in the correct orientation and position as it is lowered into the lower section 110, and as the engagement between the engagement guide 130 and the unit guide 140 is replaced by engagement with the yoke guide 146.

References to "engaging", "engagement", and related terms must be understood as including potential engagement. For example, if there is no wind during installation and the assembly 139 is perfectly vertical and correctly positioned as it is lowered directly towards and into the lower section 110, none of the unit guides 140 or yoke guides 146 may actually come into contact with any of the engagement guides 130. Even if there is misalignment, in some circumstances only a subset of the unit guides 140 or yoke guides 146 may actually come into contact with any of the engagement guides 130. The skilled person will therefore understand that "engaging", "engagement" and related terms are intended to cover any relationship in which some form of intentional guiding contact may take place, depending upon the specific installation circumstances.

Figure 13:
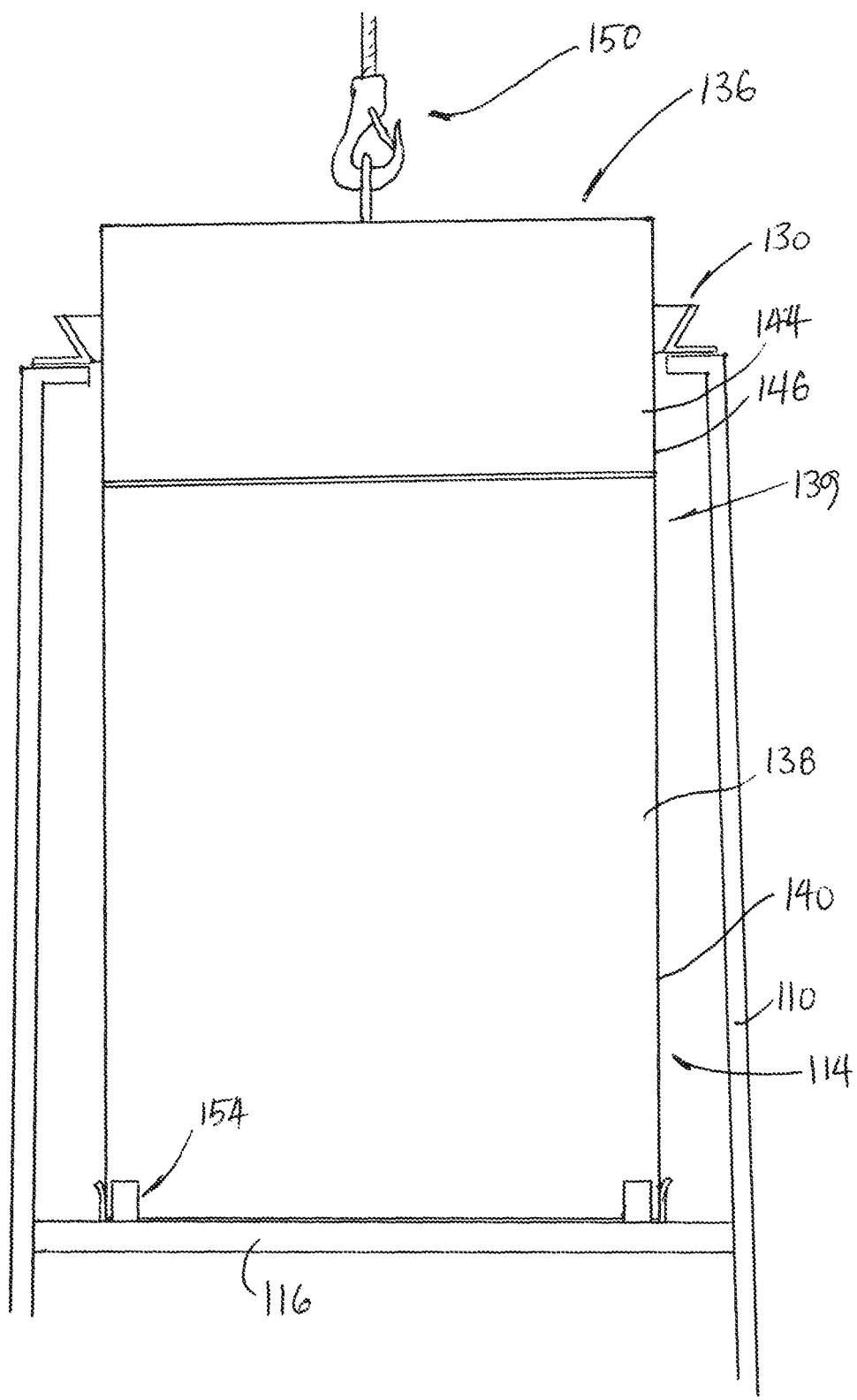
Figure 14:
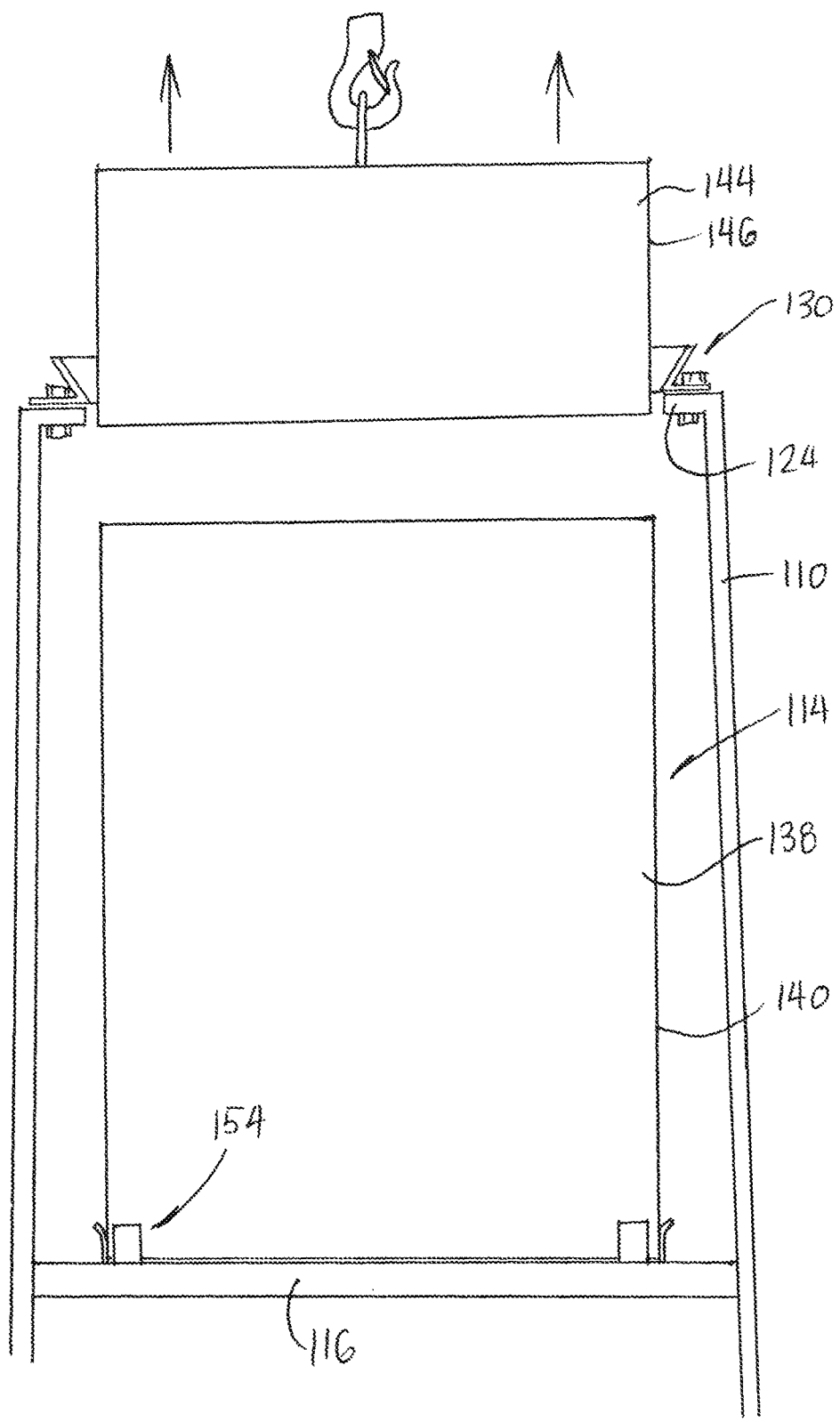

Eventually, as shown in FIG. 13, the lower ends 152 reach the struts 116. The struts 116 may include lower end guides 154, each configured to receive one of the lower ends 152 and guide it as the installation unit 114 is lowered into its final position. Once the assembly 139 reaches its final position, technicians can connect (eg, by bolting) the installation unit 114 to the struts 116, and/or install additional supports such as abutment members that engage an internal surface of the lower section 110 to stabilise the installation unit 114. Before or after this, the yoke 136 can be disconnected from the installation unit 114 and removed using the crane, as shown in FIG. 14.

Figure 15:
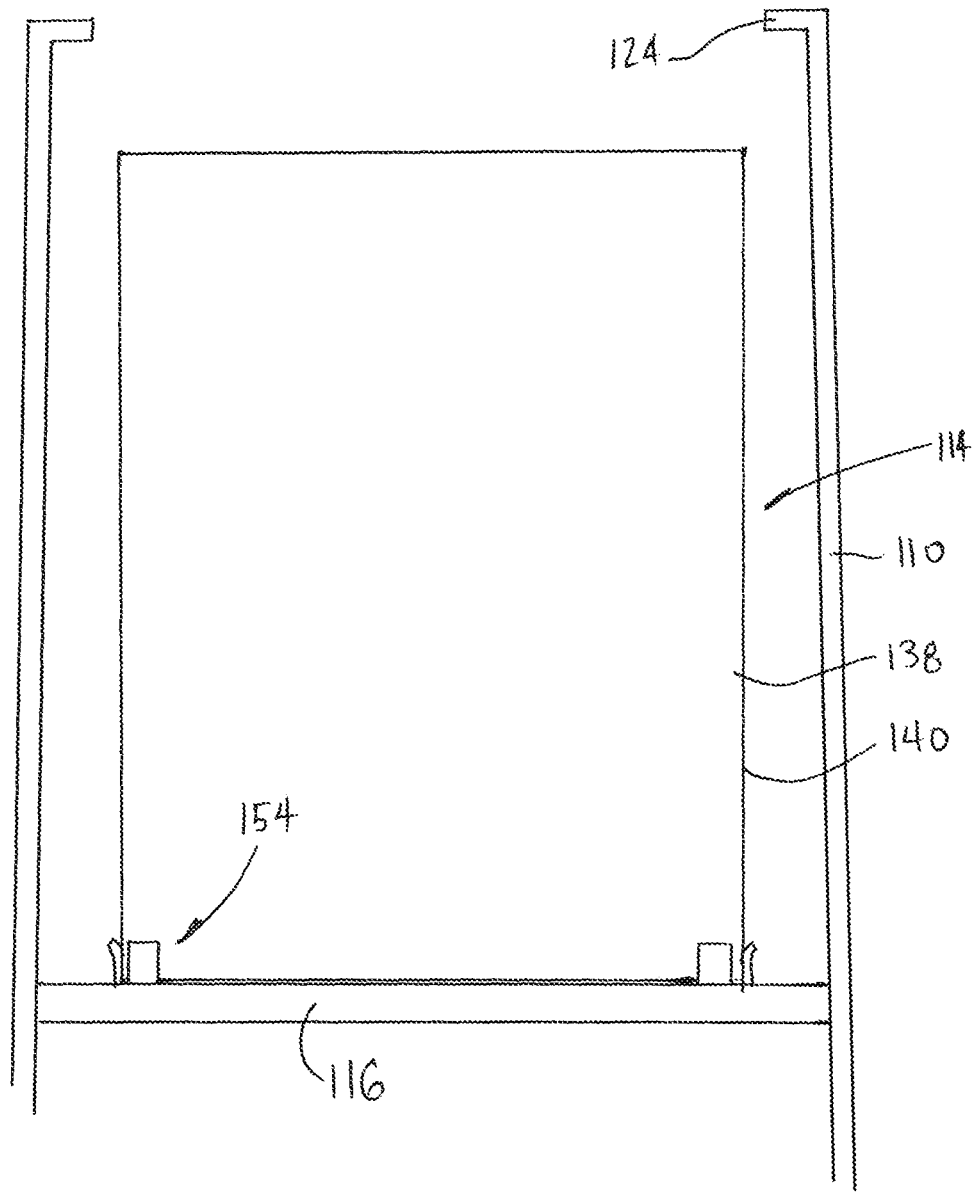

The engagement guides 130 can then be removed, as shown in FIG. 15. The upper section 112 (or nacelle, if no additional tower section is required) can then be installed on top of the lower section 110 as described above.

It will be seen that the assembly 139 is configured such that at least one of the unit guides and/or the yoke guides is or are substantially continuously engaged with at least one corresponding engagement guide 130 from when the assembly 139 enters the lower section 110 until the assembly 139 reaches its installation position within the lower section 110.

The skilled person will understand that "substantially continuously engaged" means that minor or brief discontinuities in the potential engagement between yokes guides 146 and/or unit guides 140 and their corresponding respective engagement guides 130 may be acceptable as the assembly is lowered. It may be, for example, that a small gap exists between the yoke 136 and the installation unit 114.

In the embodiment illustrated, and as best shown in FIG. 13, the yoke guides 146 remain within the plane of the engagement guides 130, even when the assembly 139 is resting on the struts 116. This ensures that the installation unit 114 cannot rotate or be moved laterally by the crane cable at any time while it is being lowered. In addition, once the yoke 136 is disconnected it can easily be withdrawn because it remains aligned by the engagement guides 130 and need not be realigned and centred before being lifted out of the lower section 110.

Although the unit guides in the described embodiment are formed by an outer edge of vertical members of the installation unit's frame, it will be appreciated that other forms of unit guides may be employed. For example, each unit guide can take the form of a rail or other elongate rigid structure that is bolted, screwed, clamped, welded, bonded or otherwise attached to the installation unit. The attachment can be to the frame, floor, or any other suitable point of the installation unit 114.

The unit guides 140 and yoke guides 146 in the described embodiment effectively form a single vertically elongate guide 148, and are configured to cooperate with relatively compact engagement guides 130 on the tower. Such unit guides 140 and yoke guides 146 can also engage with vertically elongate engagement guides (not shown). In a currently preferred embodiment, the combined length of the unit guides 140 and the yoke guides 146 (that is to say, their vertical height) may exceed the distance from the vertical plane of the engagement guides and the vertical plane of the struts 116 that support the assembly in position within the lower section 110 of the tower. In this way engagement and thus the guiding function is always ensured during the installation.

There may be several unit and/or yoke guides at each position, vertically spaced relative to each other. There may be gaps between adjacent unit and/or yoke guides. Any such gaps may be bridged by a corresponding elongate engagement guide such that the engagement guide always engages at least one of the unit guides and/or yoke guides. Alternatively, vertical spacing of the unit guides and/or yoke guides, and their corresponding engagement guides, may be selected such that at least one of the unit guides and/or yoke guides always engages a corresponding engagement guide.

The engagement guides 130 in the described embodiment include inclined surfaces 132 and 134 that together form a converging ramp 135. Alternatively, the engagement guides need not include such inclined surfaces, nor need they form a converging ramp. In that case, the engagement guide simply defines a particular position and orientation for the installation unit as it is installed. Greater tolerance may be allowed in that case to make it easier for technicians to align the installation unit with the engagement guides.

The engagement guides 130 in the described embodiment are detachable from the flange 124 once the installation unit has been installed. Alternatively, the engagement guides can be a permanent part of the tower. This can be achieved by bolting, screwing, clamping, welding, bonding or otherwise attaching an engagement guide to the tower in such a way that any additional section (or the nacelle, if the current section is the final or sole section) can be positioned on top of the current section without the engagement guides interfering with the interface and attachment between the two sections (or section and nacelle). Alternatively, the engagement guides can form an integral part of the tower itself, and can be, for example, formed near the open end of the tower, such as on or in the flange 124.

The unit guides and yoke guides in the described embodiment form vertically aligned pairs, which allows each pair to engage the same engagement guide. Alternatively, one or more of the yoke guides may be angularly offset from some or all of the unit guides, and vice versa. In that case, additional engagement guides will be required for each unit guide and/or yoke guide that does not vertically align with a corresponding yoke guide and/or unit guide.

While the yoke guides 146 are shown as being relatively short compared to the unit guides 140, the yoke guides 146 may be as long as or longer than the unit guides 114 in other embodiments, to ensure that the yoke guides 146 maintain engagement with corresponding engagement guides 130 in a particular installation as the assembly 139 is lowered.

Any of the guides can include a resilient portion to cushion engagement between the unit guide and/or yoke guide(s) and the corresponding engagement guide(s). This can be achieved by resiliently mounting any of the guides, such as on a leaf spring, coil spring, or via a resilient material such as an elastomer. Any of the guides can include one or more wheels to allow low-friction movement between it and a corresponding guide. For example, the engagement guide can include a wheel configured to engage the unit and/or yoke guides.

Any or all of the guides may be lubricated with a suitable lubricant prior to lowering of the assembly to reduce the chance of damage.

The described embodiment shows the installation unit being installed in a lower section of a two section wind turbine. The skilled person will appreciate that the installation unit can be installed in any section of a wind turbine, including a lower section, an intermediate section, or an upper section. In some cases there may only be a single section to the tower.

While it is typical for an installation unit to include a frame that is generally rectangular in plan, the installation unit and its footprint may be of any suitable shape or form factor. Similarly, although it is typical for sections of wind turbine towers to be generally frusto-conical, the sections can be of any other suitable shape and/or cross-section.

The amount of clearance allowed for movement of the installation unit through the engagement guides can be selected to suit the particular requirements of each installation. As an example, where an installation unit with a rectangular footprint or form factor is used, a clearance of 30 mm across each diagonal of the rectangle may be suitable. Where detachable engagement guides are used, their positions may be adjustable upon installation to allow for onsite adjustment of this clearance. Typically in that case, the clearance would be determined (or at least confirmed) based on onsite measurement of the installation unit. Alternatively or in addition, the yoke guides and/or unit guides may be adjustable to provide the required clearances. In addition, one or more of the guides may be angled so as to provide a reducing clearance as the assembly is lowered into the tower.

Figure 16:
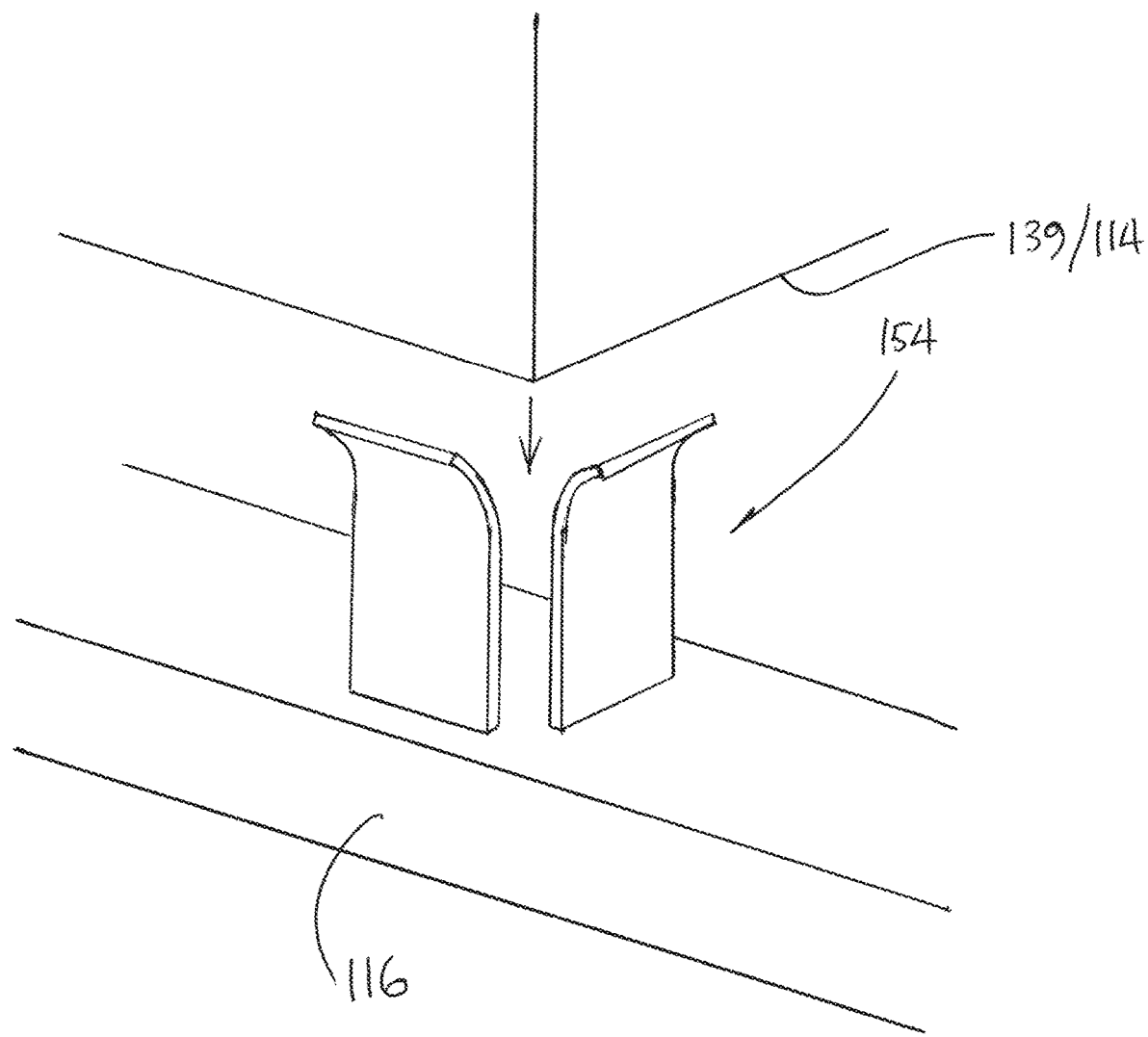
FIG. 16 is a perspective view of a lower end guide on a strut within the tower, for receiving a lower portion of the installation unit.

Turning to FIG. 16, the installation unit 114 may optionally comprise at least one camera system. In the illustrated example, a camera system 158 is provided near a lower end of each of the frame members 138. Each camera system 158 is configured and orientated to capture images comprising at least one of the engagement guides 130 while the assembly 139 is lowered towards the tower section 110. Technicians can use the captured images to assist in positioning of at least one of the unit guides 140 relative to its or their corresponding engagement guide or guides 130.

Typically, each camera system 158 is positioned to capture an image of at least a portion of the unit guide 140 of the frame member 138 to which the camera system is attached, as well as at least a portion of that unit guide's corresponding engagement guide 130. By reviewing images from each of the camera systems 158, technicians can gain a clear understanding of the relative positions of each unit guide 140 and its corresponding engagement guide 130, which assists in achieving quick and accurate alignment of the installation unit 114 and the engagement guides 130 before bringing them into contact with each other.

The or each camera system 158 may be detachably mounted to the installation unit 114, to enable uninstalling of the or each camera system 158 after the installation unit 114 has been installed into the lower section 110. The mounting may be via a strap, rope, clamp, screws, bolts or any other suitable mechanism for temporarily attaching the camera system 158 to the installation unit 114. To assist in this, the camera system may include one or more brackets (not shown). The or each camera system 158 should be attached in such a way that it (and any mounting mechanism used to attach it) does not interfere with any of the engagement guides 130.

At least one wireless communication interface may be provided on or in the assembly for sending the captured images for viewing on a remote apparatus (not shown). Each camera system 158 may be provided with its own wireless communication interface (not shown), or may communicate with a central wireless interface (not shown) that sends the captured images. If the wireless interface is separate from the camera systems 158, it may be removable after installation of the installation unit 114 is complete. In an embodiment, the captured images may be sent via a wired connection.

There may be provided an installation package for a wind turbine, comprising an assembly (such as assembly 139) and a wind turbine tower section (such as lower section 110). The tower section comprises a plurality of engagement guides (such as engagement guides 130) on or adjacent to an upper inner edge of the tower section to guide the assembly while it is lowered into the tower section.

Figure 17:
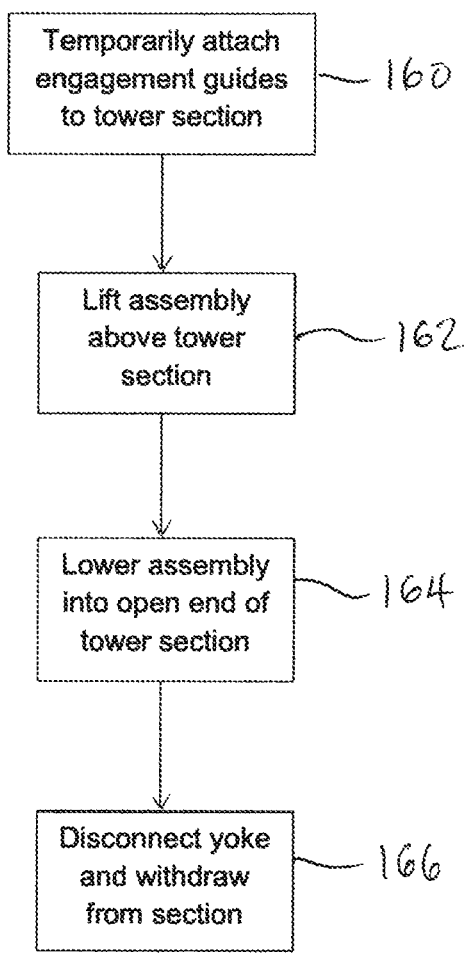
FIG. 17 is a flowchart setting out the steps for installing the installation unit in the first section, in accordance with the invention.
Figure 18:
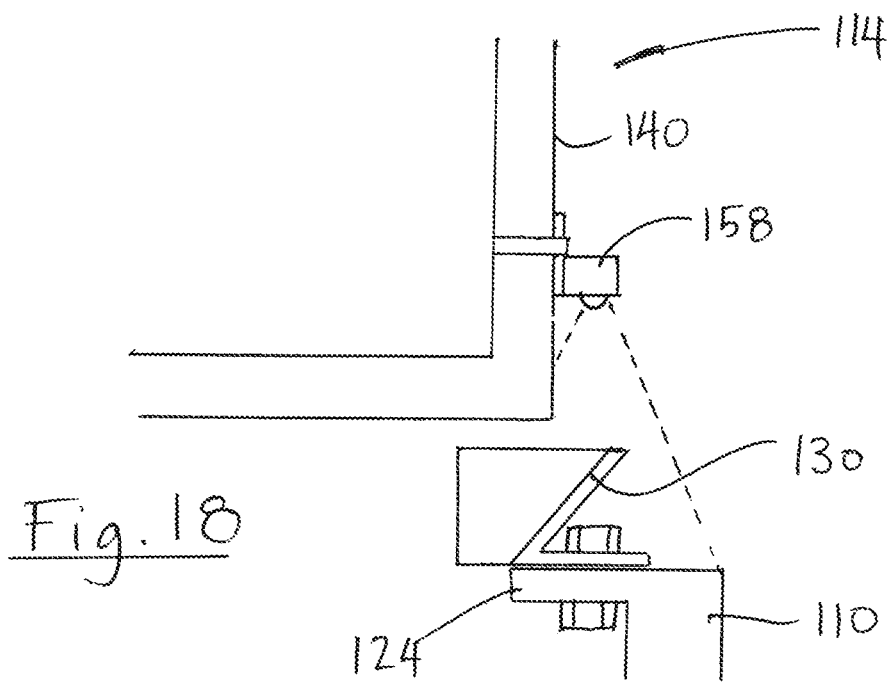
FIG. 18 is a detailed side elevation of a camera installed on a lower portion of an installation unit, such as the installation unit shown in FIG. 2A.
Figure 19:
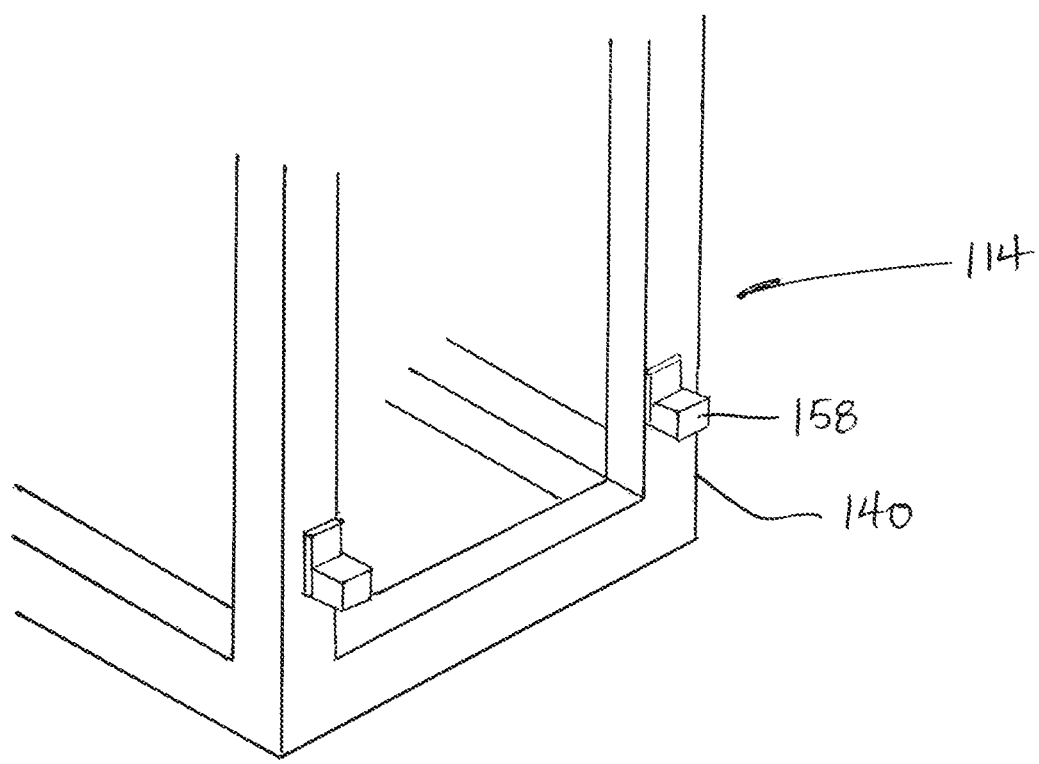
FIG. 19 is a detailed perspective view of the camera of FIG. 17 installed on the lower portion of the installation unit.

Referring to FIG. 17, there is shown a method of installing an installation unit (such as installation unit 114) in a tower section (such as lower section 110) of a wind turbine tower. The method optionally includes temporarily attaching 160 engagement guides (such as engagement guides 130) to the tower section at or adjacent the tower section's open end. Alternatively, the engagement guides may be permanently attached or formed on the section, as described above.

In step 162, the assembly may be lifted (typically using a crane) above an open end of the tower section. As described above, the assembly includes the installation unit for installation within the tower section, the installation unit comprising a plurality of circumferentially spaced-apart unit guides (such as unit guides 140). The assembly also include a yoke (such as yoke 136) releasably connected to the installation unit and comprising a plurality of circumferentially spaced-apart yoke guides (such as yoke guides 146).

In step 164, the assembly may then be lowered into the open end. Each of the unit guides is configured and positioned to engage at least one of the engagement guides so as to maintain the assembly in a predetermined position relative to the tower section while the assembly enters the open end and is lowered into it. Each of the yoke guides is configured and positioned to engage at least one of the engagement guides when they enter into the horizontal plane of the engagement guides so as to continue to maintain the assembly in a predetermined position relative to the section as the assembly is lowered further into the open end.

In step 166, the yoke may then be disconnected from the installation unit once the installation unit reaches its final position and withdrawn from the section.

Any or all of the options and alternatives discussed above may optionally be employed in relation to the method shown in the flowchart of FIG. 17.

Although the present invention has been described with reference to specific embodiments, the invention should not be construed as being in any way limited to those embodiments. The scope of the present invention is limited only by the accompanying claims. In the context of the claims, the terms "comprising" or "comprises" do not exclude other possible elements or steps. Also, the use of terms such as "a" or "an", etc, should not be construed as excluding a plurality. Furthermore, individual features mentioned in different claims may possibly be advantageously combined, and the mentioning of these features in different claims does not exclude that a combination of features is not possible and advantageous.

The invention claimed is:

1. An assembly for use in installation of a wind turbine tower, the assembly comprising:
   an installation unit for installation within a tower section of the wind turbine tower, the tower section having a lower end and an open upper end, the installation unit comprising a plurality of circumferentially spaced-apart unit guides; and
   a yoke, which forms no part of the installation unit in the tower section after installation, releasably connected to the installation unit and comprising a plurality of circumferentially spaced-apart yoke guides;
   wherein each vertically aligned yoke guide and unit guide forms a continuous vertical guide that extends between a topmost planar surface and a bottom of the assembly, the assembly being configured such that, while the assembly is being lowered through the open upper end of the tower section, at least one continuous vertical guide is substantially continuously engaged with a corresponding engagement guide on or adjacent to the open upper end of the tower section to guide the assembly from when the assembly enters the tower section until the assembly reaches its installation position within the tower section.

2. The assembly of claim 1, wherein a length of each continuous vertical guide is greater than a width of the assembly.

3. An installation package for a wind turbine, the installation package comprising: an installation unit for installation within a tower section of a wind turbine tower, the tower section having a lower end and an open upper end, the installation unit comprising a plurality of circumferentially spaced-apart unit guides, each of the unit guides being configured to engage a corresponding engagement guide on or adjacent to the open upper end of the tower section to guide the installation package while it is lowered into the open upper end of the tower section; and a yoke, which forms no part of the installation unit in the tower section after installation, releasably connected to the installation unit and comprising a plurality of circumferentially spaced-apart yoke guides, each of the yoke guides being configured to engage a corresponding engagement guide on or adjacent to the open upper end of the tower section to guide the installation package while it is lowered into the open upper end of the tower section; the installation package being configured such that, while the installation package is being lowered through the open upper end of the tower section, at least one of the unit guides and/or the yoke guides is or are substantially continuously engaged with the engagement guides from when the installation package enters the tower section until the assembly reaches its installation position within the tower section; and the wind turbine tower section comprising the plurality of engagement guides on or adjacent to an upper inner edge of the tower section to guide the installation package while it is lowered into the tower section.

4. The installation package of claim 3, wherein the engagement guides are detachable from the wind turbine tower section.

5. A method of installing an installation unit in a tower section of a wind turbine tower, comprising:
providing a partially assembled wind turbine including a tower section having a lower end and an open upper end, the open upper end comprising a plurality of engagement guides;
lifting an assembly above the open upper end of the tower section, the assembly comprising:
an installation unit for installation within the tower section, the installation unit comprising a plurality of circumferentially spaced-apart unit guides; and
a yoke releasably connected to the installation unit and comprising a plurality of circumferentially spaced-apart yoke guides;
lowering the assembly from outside the tower section to at least partially inside the tower section through the open upper end, the open end comprising a plurality of engagement guides, wherein:
each of the unit guides is configured and positioned to engage at least one of the engagement guides so as to maintain the assembly in a predetermined position relative to the tower section while the assembly enters the open end and is lowered into it; and
each of the yoke guides is configured and positioned to engage at least one of the engagement guides so as to continue to maintain the assembly in a predetermined position relative to the section as the assembly is lowered further into the open end until the assembly reaches its installation position within the tower section;
disconnecting the yoke from the installation unit; and withdrawing the yoke from the tower section.

6. The method of claim 5, comprising temporarily attaching the engagement guides to the tower section at or adjacent the open upper end prior to lowering the assembly into the open upper end.

7. The method of claim 5, further comprising:
positioning the installation unit on an internal support inside the tower section; and
securing the installation unit on the internal support, wherein when the installation unit is positioned on the internal support, at least a portion of the yoke remains within the open upper end of the tower section.

8. A system for use in installation of a wind turbine tower, the system comprising: an installation unit for installation within a tower section of the wind turbine tower, the tower section having a lower end and an open upper end, the installation unit comprising a plurality of circumferentially spaced-apart unit guides; a yoke, which forms no part of the installation unit in the tower section after installation, releasably connected to the installation unit and comprising a plurality of circumferentially spaced-apart yoke guides; and a plurality of engagement guides configured to be located on or adjacent to the open upper end of the tower section, wherein each of the unit guides and the yoke guides engage one of the plurality of corresponding engagement guides to guide the system through the open upper end of the tower section while the assembly is lowered into the open upper end of the tower section; the system being configured such that, while the assembly is being lowered through the open upper end of the tower section, at least one of the unit guides and/or the yoke guides is or are substantially continuously engaged with the engagement guides from when the system enters the tower section until the system reaches its installation position within the tower section.

9. The system of claim 8, comprising the same number of unit guides as yoke guides, wherein each of the unit guides is vertically aligned with a corresponding one of the yoke guides.

10. The system of claim 8, wherein the installation unit comprises a frame for holding electrical components, and the unit guides comprise radially outer portions of the frame.

11. The system of claim 10, wherein the frame comprises a plurality of vertically extending frame members, each unit guide comprising a radially outer edge of one of the frame members.

12. The system of claim 11, wherein the frame includes a portion that is polygonal in plan, and each of the frame members is vertically aligned with a vertex of the polygonal portion.

13. The system of claim 12, wherein the frame includes a portion that is rectangular in plan, and each of the frame members is vertically aligned with a corner of the rectangular portion.

14. The system of claim 8, wherein the assembly includes a height such that when the installation unit is installed at its final vertical position within the tower section, the yoke guides are positioned adjacent their respective engagement guides.

15. The system of claim 8, wherein the installation unit comprises at least one camera system, the camera system being configured and orientated to capture images comprising at least one of the engagement guides while the assembly is lowered towards the tower section, thereby to assist in positioning of at least one of the unit guides relative to its or their corresponding engagement guide or guides.

16. The system of claim 15, wherein the at least one camera system is detachably mounted to the installation unit, to enable uninstalling the at least one camera system after the installation unit has been installed.

17. The system of claim 15, comprising at least one wireless communication interface for sending the captured images for viewing on a remote apparatus.

* * * * *